No. 670,715. Patented Mar. 26, 1901.
J. B. MAHANA & A. A. POMPE.
BICYCLE DRIVING MECHANISM.
(Application filed Oct. 9, 1900.)

(No Model.) 2 Sheets—Sheet 1.

Witnesses
Inventors
John B. Mahana,
Adrian A. Pompe,
by their Attorneys

No. 670,715. Patented Mar. 26, 1901.
J. B. MAHANA & A. A. POMPE.
BICYCLE DRIVING MECHANISM.
(Application filed Oct. 9, 1900.)

(No Model.) 2 Sheets—Sheet 2.

Witnesses:
Sidney P. Hollingsworth
C. B. Bull

Inventors
John B. Mahana,
Adrian A. Pompe,
by their Attorneys

THE NORRIS PETERS CO., PHOTO-LITHO., WASHINGTON, D. C.

UNITED STATES PATENT OFFICE.

JOHN B. MAHANA AND ADRIAN A. POMPE, OF TOLEDO, WASHINGTON.

BICYCLE DRIVING MECHANISM.

SPECIFICATION forming part of Letters Patent No. 670,715, dated March 26, 1901.

Application filed October 9, 1900. Serial No. 32,543. (No model.)

*To all whom it may concern:*

Be it known that we, JOHN B. MAHANA and ADRIAN A. POMPE, citizens of the United States, residing at Toledo, in the county of Lewis and State of Washington, have invented certain new and useful Improvements in Bicycle Driving Mechanism, of which the following is a full, clear, and exact description, reference being had to the accompanying drawings and to the characters of reference marked thereon.

This invention relates to improvements in bicycles and such other vehicles as are propelled by the action of the feet of the rider upon suitable mechanism connected to and rotating one of the supporting-wheels of said vehicle.

A principal object of this invention is to so combine and arrange the propelling mechanism that greater utility, convenience, and durability are obtained with small friction, weight, and cost.

A further feature of the invention consists in a simple, cheap, and easily-operated changeable-speed gearing by means of which and without stopping the running of the vehicle the rate of speed between the stroke of the feet and the driving-wheel may be varied.

Other features of the invention not specifically set forth at this time will be fully described in the specification and pointed out in the claims.

Figure 1:
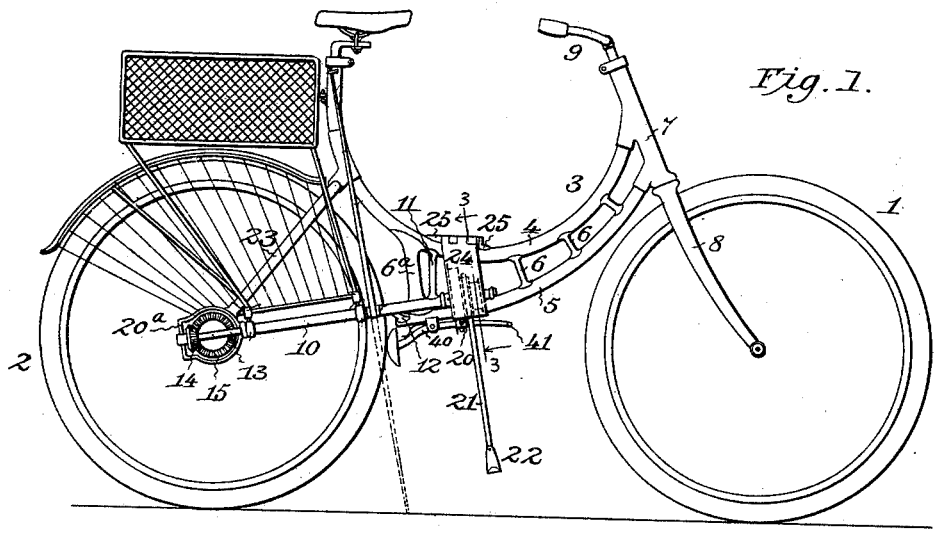
Figure 2:
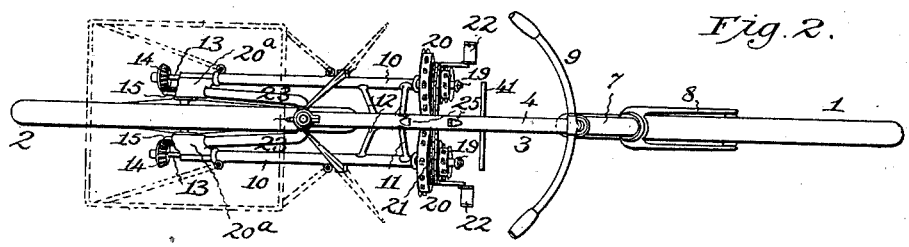
Figure 3:
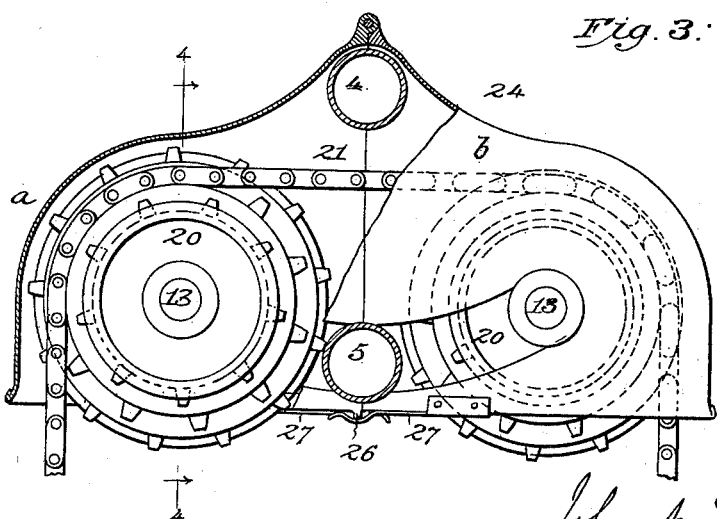
Figure 4:
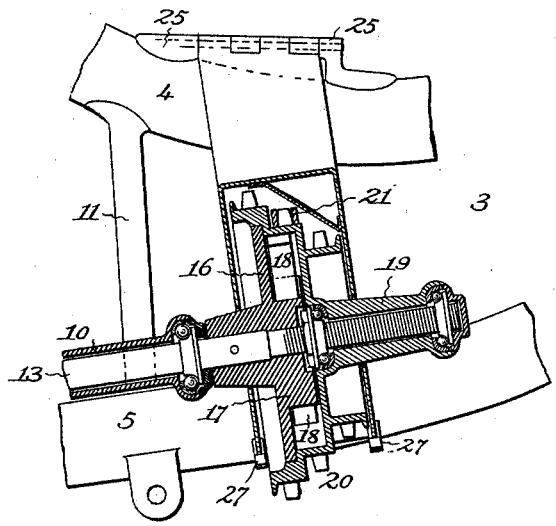
Figure 5:
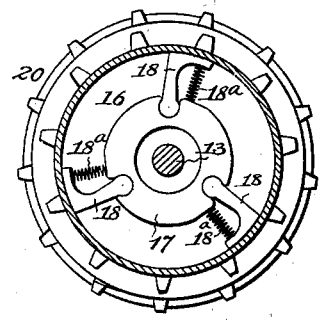

In the drawings, Figure 1 is a side elevation of a bicycle constructed in accordance with our invention. Fig. 2 is a plan view of the same, certain parts being removed to more clearly illustrate the construction. Fig. 3 is an enlarged cross-sectional view on the line 3 3 of Fig. 1 looking in the direction of the arrows. Fig. 4 is a longitudinal section on the line 4 4 of Fig. 3. Fig. 5 is a detail view of a clutch mechanism hereinafter described.

Similar characters of reference indicate similar parts in the respective figures.

1 indicates the front or steering wheel, and 2 the rear or driving wheel of a bicycle, both journaled in the main frame 3. The front portion of the frame 3 is constructed, chiefly, of two curved tubes 4 and 5, placed in the same vertical plane and connected rigidly together by studs or brace pieces 6. A tube 7, secured to the forward ends of the curved tubes 4 5, serves as a head-socket for the front fork 8, in which the steering-wheel 1 is supported and to which the handle-bar 9 is attached, as usual. The upper tube 4 of the frame 3 curves downwardly, rearwardly, and then upwardly from the head-socket 7, finally terminating at a point above the rear wheel, in front of its axle and about on a level with the handle-bar, where it forms a support for the seat-post and seat, as shown. The lower frame-tube 5, which is approximately parallel to but beneath the tube 4, curves downwardly and rearwardly to a point just in front of the rear wheel, where it ends. A strut 6$^a$ connects this end of the tube 5 to the upper tube 4. The rear portion of the main frame 3 consists of tubular frame-bars 10, one on each side of the rear wheel 2, the bars being rigidly attached to the frame-tubes 4 and 5 by connecting-struts 11 and 12, respectively. The tubular bars 10 extend from the rear axle forwardly and upwardly in a straight line to a point in front of the brace 6$^a$, where they are joined, as before stated, by the struts 11 12 to the frame-tubes 4 5. It is to be observed that at no point does the frame 3 extend below the plane of the axes of the wheels 1 2, the result being a strong, light, and rigid frame of such form that the vehicle may be ridden by men or women with equal ease and comfort.

Extending longitudinally through each tube 10 is a shaft 13, having at its rear end a bevel-pinion 14, which engages with a bevel-gear 15, keyed to the hub of the rear or driving wheel 2, while the forward end of each shaft carries suitable mechanism employed in the rotation of said shafts and the driving-wheel 2. This mechanism consists of a series of sprocket-wheels, preferably three in number and of different diameters for obtaining different speeds. A sprocket-chain 21, operated by the feet of the rider, passes over one of the sprocket-wheels on each shaft 13, causing said sprocket-wheels to turn back and forth as the feet are alternately raised and lowered. Each series of sprocket-wheels is caused to rotate its shaft 13 when turning in one direction only by means of a noiseless ratchet, now to be described. On each shaft 13, near its forward end, is pinned or otherwise fastened a disk 16, each disk being provided with a hub 17, having sockets near its periphery, in which friction-pawls 18 are journaled. On each shaft 13, in front of the disk 16, is a hub 19, adapted to rotate on ball-bearings carried by the shaft, as seen in Fig. 4. To each hub is attached a series of three sprocket-wheels 20, preferably integral with each other and with the hub. These sprocket-wheels 20 are of different diameters and so arranged that those on one shaft will lie in the same planes as the corresponding sprockets on the other shaft. The sprocket-wheels 20 are made hollow or cup-shaped and are assembled on their shaft 13 in such manner that the largest sprocket extends rearwardly over the disk, so that the friction-pawls 18 may engage with the inside surface of the second sprocket. The arrangement of the friction-pawls with relation to the contacting surface is such that when the sprocket 20 is turned to the right it will engage the pawls 18 and turn the shaft 13, while a contrary rotation of the sprocket will not affect the shaft. Springs $18^a$, placed between each pawl and the hub 17, keep the pawls always in contact with their bearing-surfaces, so that they will instantly engage therewith when the sprockets are turned in the proper direction. The sprocket on the left of the machine will cause its shaft to turn when turned to the left, but is inoperative thereon when turned to the right.

The sprocket-chain 21, having a stirrup 22 at each end, is placed over and in engagement with corresponding sprockets on the shafts 13, so that the rider on desiring to propel the vehicle will alternately depress one or the other of the stirrups with a foot, and thus impart a substantially continuous force to the driving-wheel. The mechanism being thus disposed, the stroke may be long or short without interfering with the motion of the driving mechanism.

A gear-case $20^a$ is attached to the rear end of each tube 10, the bevel-pinion 14 and gear 15 being protected by the case from dust and dirt. A tube 23, running upwardly and forwardly from each gear-case $20^a$ and attached to the frame-tube 3, acts as a brace to further strengthen the frame and distribute the strains generated by the weight of the rider to the axle of the rear wheel.

To protect the apparel of the rider from becoming entangled in the sprocket-gearing and in order that the neat and finished appearance of the vehicle may be enhanced, we inclose the sprocket-wheels within a housing or case 24, as indicated in Figs. 1, 3, and 4. As shown, the housing consists of two parts $a$ and $b$, one part resting over each series of sprockets 20. These parts are pivoted to each other at their upper edges and to brackets 25, attached to the top of the frame-tube 4. The bottom of the housing is open, so that each part may be turned on its pivot to expose the sprockets. To fasten the two parts of the housing together when closed, a lug 26 projects downwardly from the lower edge of the front face of the part $a$, which engages a spring-catch 27 on the part $b$. A similar arrangement is formed on the rear face of the housing, but in this case the lug 26 is formed on the part $b$, and the spring-catch on the part $a$. As thus arranged, when it is desired to change the driving mechanism from speed to power, or vice versa, the rider grasps the part $a$ or $b$ of the housing and turns it on its pivot, the lug 26 pulling away from the spring-catch 27. This exposes one of the sprocket-wheels 20 and the chain passing over it. The rider now takes the chain between his thumb and finger and lifts it off one of the sprockets 20 and places it on the one desired, after which the housing is closed. The same operation is performed on the other side of the vehicle to place the chain on the corresponding sprocket on that side. Normally the chain runs on the middle sprockets, the forward ones being of small diameter for speed, while the rear ones are larger for power.

A brake-lever 40, pivoted to the under side of the frame 3, carries a shoe on its rear end adapted to bear against the tire of the rear wheel. Two arms 41 extend laterally from the forward end of the lever in position to be operated by the foot of the rider at the time in its highest position.

It is apparent that changes in construction and arrangement may be made in this vehicle or machine without departing from the spirit of our improvement, and such changes or deviations as may suggest themselves to the skilled mechanic without the exercise of invention are considered by us to be within the scope of our claims.

Having thus described our invention, we claim—

1. In a vehicle of the class described, the combination with the frame, of a steering-wheel and a driving-wheel, a gear-wheel on each end of the hub of the driving-wheel, a shaft on each side of the driving-wheel passing longitudinally through a portion of the frame, and having a pinion on its rear end to engage with the gear on the corresponding side, a clutch on the forward end of each of the side shafts, sprocket-wheels adapted to rotate the shafts and a foot-operated chain to give motion to the sprocket-wheels, substantially as set forth.

2. In a vehicle of the class described, the combination with the frame, of a steering and a driving wheel, a longitudinal shaft on each side of the driving-wheel, each shaft being journaled within one of the frame-tubes, a clutch on the forward end of each shaft, a series of sprocket-wheels of different diameters on each shaft, adapted to engage the clutch and rotate the shafts when revolved in one direction, a chain having a stirrup at each end, common to both series of sprocket-wheels by means of which the sprocket-wheels are rotated in opposite directions, and gears for imparting motion to the driving-wheel from the said shafts, substantially as set forth.

3. In a vehicle of the class described having series of sprockets 20, the combination with a frame having brackets, of a gear housing or case consisting of two parts $a$ and $b$ pivoted to each other at their upper edges and to said brackets, one part resting over each series of sprockets 20, the bottom of the housing being open so that each part may be turned on its pivot to expose the sprockets, said part $a$ of the housing being provided with a lug 26, and the part $b$ with a spring-catch 27, by means of which the two parts of the housing may be clasped together, substantially as set forth.

In testimony whereof we hereunto set our hands.

JOHN B. MAHANA.
ADRIAN A. POMPE.

Witnesses:
E. F. CARPENTER,
C. F. CARPENTER.